United States Patent
Iyer et al.

(10) Patent No.: US 9,886,762 B2
(45) Date of Patent: Feb. 6, 2018

(54) METHOD FOR RETRIEVING IMAGE AND ELECTRONIC DEVICE THEREOF

(71) Applicant: SAMSUNG ELECTRONICS CO., LTD., Suwon-si (KR)

(72) Inventors: Kiran Nanjunda Iyer, Bangalore (IN); Raushan Kumar, Bangalore (IN); Satish Lokkoju, Bangalore (IN); Viswanath Gopalakrishnan, Bangalore (IN); Viswanath Veera, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 14/808,014

(22) Filed: Jul. 24, 2015

(65) Prior Publication Data
US 2016/0027180 A1    Jan. 28, 2016

(30) Foreign Application Priority Data

Jul. 25, 2014   (IN) .................... 3644/CHE/2014(PS)
Mar. 13, 2015   (IN) .................... 3644/CHE/2014(CS)
Jun. 11, 2015   (KR) ........................ 10-2015-0082682

(51) Int. Cl.
*G06T 7/00* (2017.01)
*G06F 17/30* (2006.01)
*G06K 9/62* (2006.01)
*G06T 7/143* (2017.01)
*G06T 7/162* (2017.01)

(52) U.S. Cl.
CPC ...... *G06T 7/0042* (2013.01); *G06F 17/30268* (2013.01); *G06K 9/6276* (2013.01); *G06T 7/143* (2017.01); *G06T 7/162* (2017.01); *G06K 2209/27* (2013.01); *G06T 2207/20104* (2013.01)

(58) Field of Classification Search
CPC ................ G06K 9/6202; G06K 9/0014; G06F 17/30268; G06F 3/0482; H04N 21/4722; G06T 7/70
See application file for complete search history.

(56) References Cited

U.S. PATENT DOCUMENTS 7,720,258 B1   5/2010  Ullmann
8,300,953 B2 * 10/2012  Lindley ............. G06F 17/30038
                                                    382/190

(Continued)

FOREIGN PATENT DOCUMENTS

WO   2011/154166 A1   12/2011
WO   2013/075316 A1    5/2013

OTHER PUBLICATIONS

Communication dated Dec. 16, 2015 issued by the Korean Intellectual Property Office in counterpart Korean Patent Application No. PCT/KR2015/007673.

(Continued)

*Primary Examiner* — Iman K Kholdebarin
*Assistant Examiner* — Mai Tran
(74) *Attorney, Agent, or Firm* — Sughrue Mion, PLLC

(57) ABSTRACT

The present disclosure relates to image retrieval in an electronic device. An operating method of an electronic device includes determining an object included in an image and a position of extent occupied by the object in the image and retrieving at least one image including the object at the position from among a plurality of images.

18 Claims, 19 Drawing Sheets

(56) References Cited

U.S. PATENT DOCUMENTS

| | | | | |
|---|---|---|---|---|
| 8,331,760 | B2* | 12/2012 | Butcher | H04N 21/234318 382/256 |
| 8,396,246 | B2* | 3/2013 | Anbalagan | G06K 9/00496 382/100 |
| 8,693,846 | B2* | 4/2014 | Prestenback | H04N 5/44591 386/248 |
| 8,861,804 | B1* | 10/2014 | Johnson | G06K 9/00221 382/118 |
| 2004/0120572 | A1* | 6/2004 | Luo | G06F 17/30247 382/159 |
| 2005/0008263 | A1* | 1/2005 | Nagahashi | G06F 17/30247 382/305 |
| 2007/0286531 | A1* | 12/2007 | Fu | G06F 17/30277 382/305 |
| 2009/0174787 | A1* | 7/2009 | Grim, III | G06K 9/00295 348/222.1 |
| 2012/0072410 | A1* | 3/2012 | Wang | G06F 17/30268 707/711 |
| 2013/0058535 | A1* | 3/2013 | Othmezouri | G06K 9/00369 382/103 |
| 2013/0156348 | A1* | 6/2013 | Irani | G06F 17/30244 382/305 |
| 2014/0219538 | A1* | 8/2014 | Guthrie | G06K 9/00127 382/133 |
| 2014/0270350 | A1* | 9/2014 | Rodriguez-Serrano | G06K 9/6217 382/103 |
| 2014/0324823 | A1* | 10/2014 | Iorio | G06F 17/30268 707/722 |

OTHER PUBLICATIONS

Communication dated Dec. 13, 2017, issued by the European Patent Office in counterpart European Application No. 15824151.3.

Alexey Dosovitskiy et. al., "Discriminative Unsupervised Feature Learning with Convolutional Neural Networks", Jun. 26, 2014 (Jun. 26, 2014), XP055428055, pp. 1-13, (13 pages total).

* cited by examiner (a)

(b)

(c)

(d)

(a)

(b)

(c)

METHOD FOR RETRIEVING IMAGE AND ELECTRONIC DEVICE THEREOF

PRIORITY

This application claims the benefit under 35 U.S.C. § 119(a) of Indian Patent Application on Jul. 25, 2014 and on Mar. 13, 2015, filed in the Indian Intellectual Property Office and assigned Serial No. 3644/CHE/2014 and of Korean Patent Application on Jun. 11, 2015, field in the Korean Intellectual Property Office and assigned Serial No. 10-2015-0082682, the disclosures of which are incorporated herein by reference.

BACKGROUND

1. Field of the disclosure

Embodiments of the present disclosure relate to methods and electronic devices configured to retrieve at least one image from an image database. Specifically, the present disclosure relates to a method and a system for retrieving at least one image from an image database based on semantic composition information.

2. Description of Prior Art

The popularity of digital images is rapidly increasing due to the rapid improvement in digital imaging technologies and easy availability and sharing capacity of digital images facilitated by the Internet. More and more digital images are becoming available every day. Automatic image retrieval systems provide an efficient way for users to navigate through the growing numbers of available images.

The existing image search and image retrieval systems allow users to retrieve images using text based image retrieval or content based image retrieval. While using text based image retrieval, it is difficult for a user to precisely describe an image to be retrieved using the text input by a user. As a result, retrieval accuracy is severely limited as the images that cannot be described or can only be described ambiguously may not be retrieved successfully.

Furthermore, while using content based image retrieval, the retrieval accuracy is affected as the image search is based on similarity in features of the query image and the retrieved images. The searches performed by the existing systems may return entirely irrelevant images possessing similar features.

Further, the existing image databases comprise an enormous amount of images stored in the image database. The increasing number of images reduce the accuracy and rate of searching and retrieving the images. Thus, the existing systems and methods do not provide an effective and rapid method of retrieving the images from the image database.

The above information is presented as background information only to help the reader better understand the present disclosure. Applicants have made no determination and make no assertion as to whether any of the above might be applicable as Prior Art with regard to the present application.

SUMMARY

The principal object of the embodiments herein is to provide a system and method for retrieving at least one image from an image database.

Another object of the embodiments herein is to provide a mechanism to receive, at an electronic device, input image data. The input image data comprises object data and position data corresponding to the semantic composition queried by the user.

Yet another object of the embodiments herein is to provide a mechanism to retrieve, by the electronic device, at least one image from the image database matching the object data and the position data corresponding to the object data.

Yet another object of the embodiments herein is to provide a mechanism to display the retrieved image on a user interface of the electronic device. The retrieved image matches user provided semantic composition information of the input image data.

Yet another object of the embodiments herein is to provide a mechanism to associate each image of the image database with object data and position data corresponding to the object data.

Yet another object of the embodiments herein is to provide a mechanism to extract the object data and the position data corresponding to the object data associated with each image using at least one of a unsupervised segmentation information to enhance accuracy of at least one of a supervised segmentation of the image to understand the semantic composition of the image.

According to an aspect of an exemplary embodiment, a method for operating an electronic device includes determining an object included in an image and a position of extent occupied by the object in the image, and retrieving at least one image including the object at the position from among a plurality of images.

According to an aspect of an exemplary embodiment, an electronic device includes a controller configured to determine an object included in a image and a position of extent occupied by the object in the image and to retrieve at least one image including the object at the position from among a plurality of images.

According to an aspect of an exemplary embodiment, a method retrieving images in an electronic device includes displaying an image, receiving stroke inputs from a user demarcating an object and a position of extent occupied by the object in the image from the user, and retrieving at least one image, from among a plurality of images, including the object at the position as input by the user.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
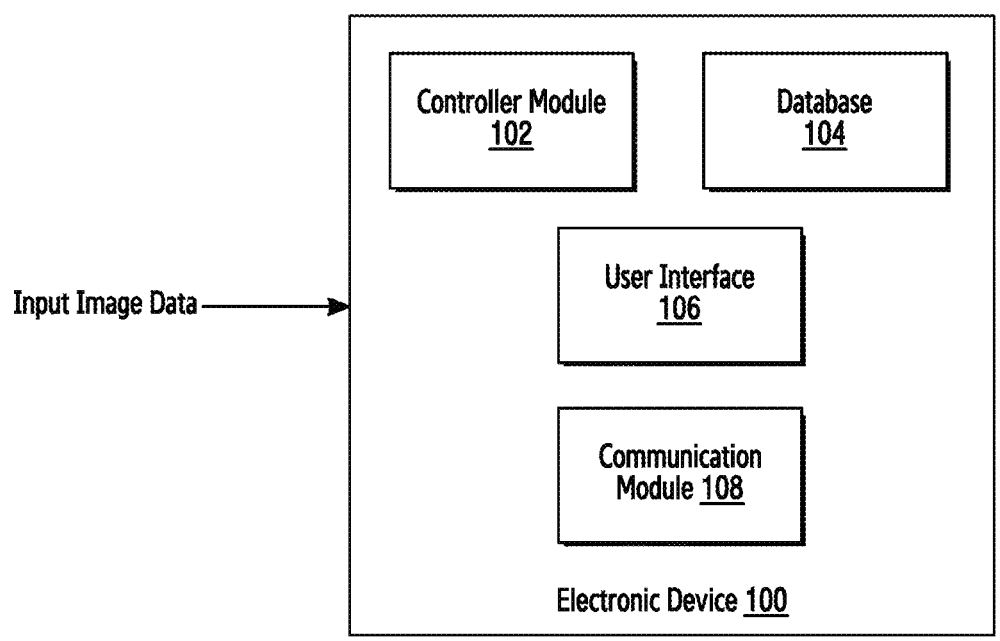
FIG. 1A illustrates a block diagram of an electronic device configured for retrieving at least one image from an image database, according to an exemplary embodiment.

The embodiments herein and the various features and advantageous details thereof are explained more fully with reference to the non-limiting exemplary embodiments that are illustrated in the accompanying drawings and detailed in the following description. Descriptions of well-known components and processing techniques are omitted so as to not unnecessarily obscure the exemplary embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the exemplary embodiments herein can be practiced and to further enable those skilled in the art to practice the embodiments herein. Accordingly, the examples should not be construed as limiting the scope of the embodiments herein.

The embodiments herein provide a method and an electronic device configured to retrieve at least one image from an image database. Specifically, the present disclosure relates to a method and a system for retrieving at least one image from an image database based on user provided semantic composition information. In order to retrieve the image from the image database, an input image data is received at the electronic device. Herein, the database indicates the group of at least one data including a plurality of images. The database may be named as an image database. A plurality of images are stored in an electronic device, or, are stored outside the electronic device. The input image data comprises object data and position data corresponding to the object data. The object data can include information regarding what an object in the image represents. For example, the object data may be 'car', 'tree', or a 'mountain'. The position data includes an area of coverage of a label of the object in the image.

In one exemplary embodiment, the object data and the position data corresponding to the object data is marked by a user as strokes on a reference image. In another embodiment, the object data and the position data corresponding to the object data is marked by the user as a nomenclature on the reference image. In another embodiment, the object data and the position data corresponding to the object data is drawn by the user on a user interface of the electronic device.

After receiving the input image data, at least one image is retrieved from the image database matching the object data and the position data corresponding to the object data. The retrieved image is displayed on the user interface of the electronic device, according to an exemplary embodiment.

The image database comprises a plurality of images. Each image of the plurality of images is associated with the object data and the position data corresponding to the object data, according to an exemplary embodiment. The object data and the position data corresponding to the object data indicate semantic information of each image. The object data and the position data corresponding to the object data is extracted from each image based on using at least one of unsupervised segmentation information to enhance the accuracy of at least one of a supervised segmentation of the image.

Unlike the existing methods and systems, the proposed method retrieves images accurately as input image composition of the input image data is represented using the object data and the position data corresponding to the object data. The proposed system and method allows the user to indicate an input image as a composition of semantic data. As the input image data is represented using the semantic data or the semantic information, it is not essential to segment or process the input image data. Thus, the computation is reduced, thereby reducing the time required to retrieve the image.

Moreover, each image in the image database is also associated with the object data and the position data corresponding to the object data. The image is stored along with the semantic information as metadata. As the input image data and the images in the image database are represented using the semantic information, the retrieval of the images matching the input image data is faster.

Referring now to the drawings where similar reference characters denote corresponding features consistently throughout the figures, there are shown exemplary embodiments.

FIG. 1A illustrates a block diagram of an electronic device 100 configured for retrieving at least one image from an image database, according to an exemplary embodiment. The electronic device 100 described herein can be a cellular phone, a smart phone, a wireless organizer, a personal digital assistant (PDA), a desktop computer, a terminal, a laptop, a tablet, a handheld wireless communication device, a notebook computer, a portable gaming device, an Internet-connected television, a set-top box, a digital picture frame, a digital camera, an in-vehicle entertainment system, an entertainment devices such as MP3 or video players, or the like.

The electronic device 100 can be configured to include a controller module 102, a database 104, a user interface 106, and a communication module 108. For example, the controller module 102 may be named as a controller. The database 104 may include the image database or a video database.

The controller module 102 can be configured to receive the input image data. The input image data comprises object data and position data corresponding to the object data. The object data includes information regarding what an object in the image represents. For example, the object data may be 'car', 'tree', or a 'mountain'. The position data includes an area of coverage of a label of the object in the image. In one exemplary embodiment, the object data and the position data corresponding to the object data is marked by a user via strokes on a reference image. In another exemplary embodiment, the object data and the position data corresponding to the object data is marked by the user using a nomenclature on the reference image.

In yet another exemplary embodiment, the object data and the position data corresponding to the object data is drawn by the user on the user interface 106 of the electronic device 100.

In one exemplary embodiment, the user interface 106 can be an external display unit such as an external monitor or panel, television screen, projector, or virtual retinal display (via a data port or transmitter, such as a Bluetooth® transceiver, USB port, HDMI port, DVI port, or the like).

In another exemplary embodiment, the user interface 106 can be can be an internal display unit such as a monitor or a panel of the electronic device 100, touch screen interface of the electronic device 100, or the like.

Further, the controller module 102 can be configured to retrieve at least one image from the image database matching the object data and the position data corresponding to the object data. The controller module 102 can be configured to display the retrieved image on the user interface 106 of the electronic device 100. The retrieved image matches user provided semantic composition information of the input image data.

The image database comprises a plurality of images. Each image of the plurality of images is associated with object data and position data corresponding to the object data. The object data and the position data corresponding to the object data indicate semantic information of each image. The image may be stored in the image database along with the semantic information as the metadata of the image. As each image is stored along with the semantic metadata, the retrieval of the images matching the input image data is faster.

The object data and the position data corresponding to the object data is extracted from each image based on at least one of a supervised learning technique and an unsupervised learning technique. The controller module 102 can be configured to extract the semantic information from the image using a combination of the supervised learning technique and the unsupervised learning technique. Therefore, errors occurring in either of the techniques are eliminated providing an accurate extraction of the semantic information.

Figure 1B:
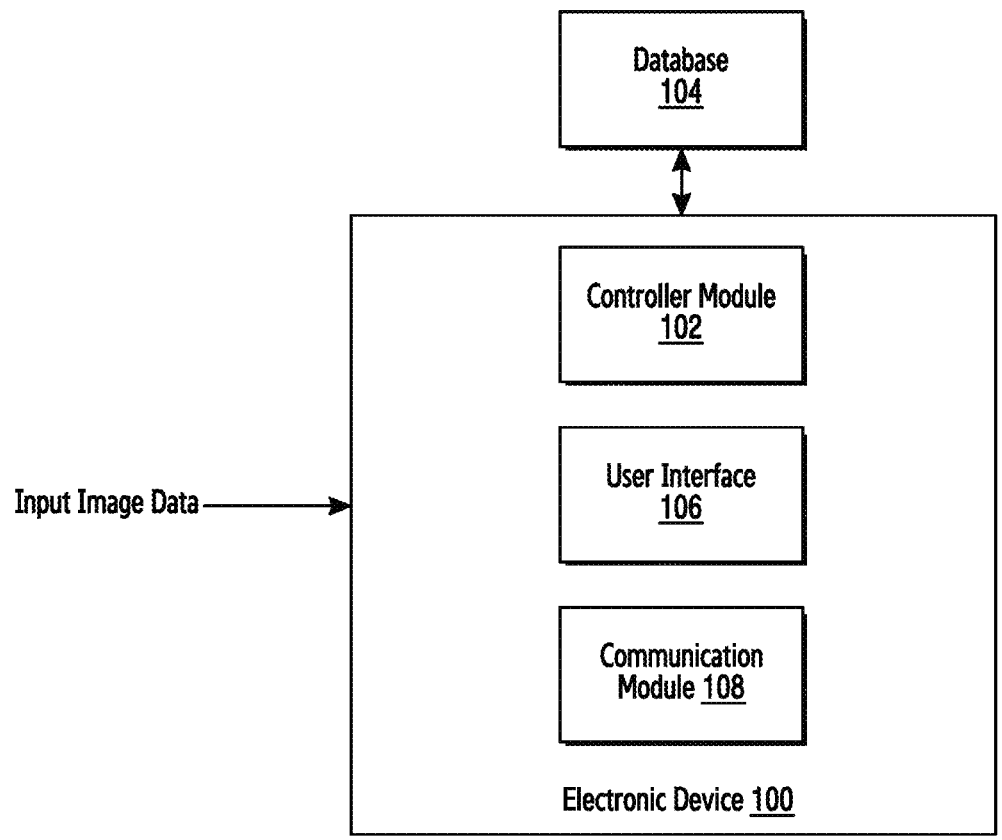
FIG. 1B illustrates another block diagram of the electronic device configured for retrieving at least one image from the image database, according to an exemplary embodiment.

FIG. 1B illustrates a block diagram of an electronic device 100 configured for retrieving at least one image from the image database, according to an exemplary embodiment, the database 104 including a pool of images can be a part of a remote storage providing servers to user to retrieve images from various data sources such as search engines, image retrieval systems, and the like. The various data sources can be configured to store the images in the cloud and provide remote services to the electronic device 100. The communication module 108 can be configured to provide sufficient interfaces or channels to allows the communicate between the electronic device 100 and the database 104.

The FIGS. 1A and 1B illustrates a limited overview of the electronic device 100 but, it is to be understood that other exemplary embodiments are not limited thereto. The labels provided to each module or component is only for illustrative purpose and does not limit the scope of the disclosure. Furthermore, one or more modules described in the exemplary embodiments can be combined or separated to perform similar or substantially similar functionalities without departing from the scope of the disclosure. Furthermore, the electronic device 100 can include various other modules or components interacting locally or remotely along with other hardware or software components to communicate with each other. For example, the component can be, but is not limited to, a process running in the controller or processor, an object, an executable process, a thread of execution, a program, or a computer.

Figure 2:
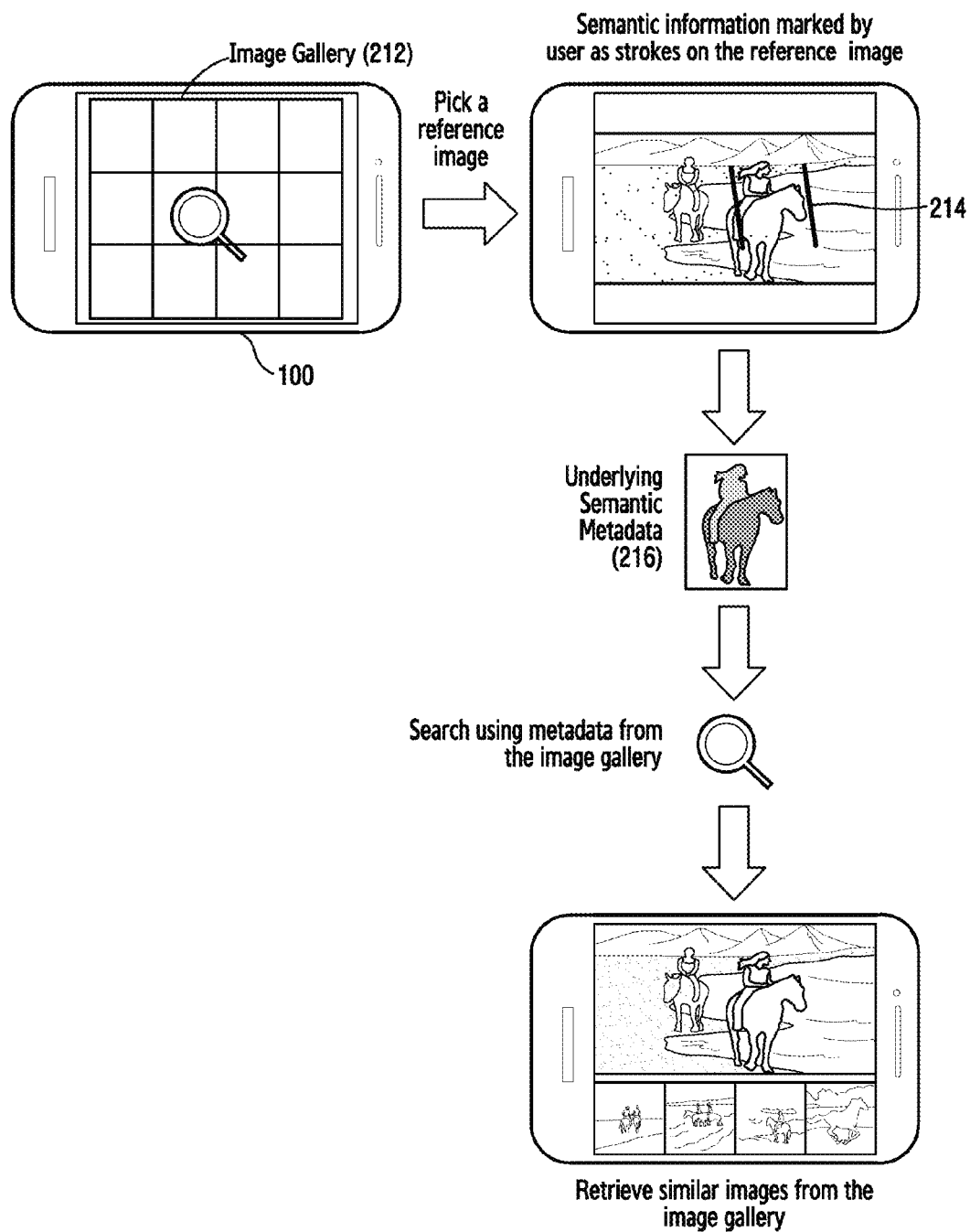
FIG. 2 illustrates an example scenario of retrieving at least one image from the image database when object data and position data corresponding to the object data is marked by a user as strokes on a reference image, according to an exemplary embodiment.

FIG. 2 illustrates an example scenario of retrieving at least one image from the image database when the object data and the position data corresponding to the object data is marked by a user as strokes on a reference image, according to an exemplary embodiment. As shown in the FIG. 2, the electronic device 100 may be a mobile device. The image database may be a plurality of images displayed through an image gallery 212 installed in a mobile device.

Referring to FIG. 2, the user may choose the reference image from the image gallery 212. The controller module 102 can be configured to allow the user to provide the input image data. Further, the controller module 102 can be configured to receive the input image data provided by the user. The input image data may include the object data and the position data corresponding to the object data. The object data and the position data corresponding to the object data may be the semantic information marked by user as the strokes 214 on the reference image. Further, the semantic information is determined by the controller module 102 which determines an object included in an image and a position of extent occupied by the object in the image. As illustrated in the FIG. 2, the object data may include 'Horse+ Woman'. The position data associated with the object data 'Horse+Woman', may include position parameters such as 'Horse+Woman in right half of an image'. The position parameters may also include position co-ordinates of the object data, if pixels of the reference image are represented in a graphical format.

Further, the semantic information may indicate the semantic metadata 216 of the input image data. The image gallery 212 installed in the mobile device displays a plurality of images. Each image of the plurality of images is associated with the object data and the position data corresponding to the object data. Thus, each image displayed on the image gallery 212, is stored with the semantic metadata or is stored by including semantic metadata corresponding to an image. Further, each image is associated with information for an object included in an image and a position of extent occupied by the object in the image. Herein, the object data may be named as an object and the position data may named as a position.

Further, the controller module 102 can be configured to search for images matching the semantic metadata of the input image data. The controller module 102 can be configured to detect if the semantic metadata associated with each image displayed on the image gallery 212 matches the semantic metadata of the input image data. Further, the controller module 106 can be configured to retrieve the images matching the semantic metadata of the input image data. The retrieved images are further displayed on the user interface 106 of the mobile device.

Further, if a user captures an image using the mobile device, the controller module 102 computes semantic information corresponding to each object included in an image and controls a storage to store the semantic information with the captured image.

Furthermore, the metadata obtained after semantic segmentation of a query image, may be used to understand extent specified by a stroked drawn by a user. For example, if an image is inputted by an electronic device, an image may be processed to be identified as that objects included in an image are segmented into each extent of the images through a semantic segmentation engine. Further, semantic information corresponding to at least one of the objects included in an image may be extracted from an image based on strokes drawn on the user interface 106 along with user control to be matched with meta semantic information of other stored images.

Figure 3A:
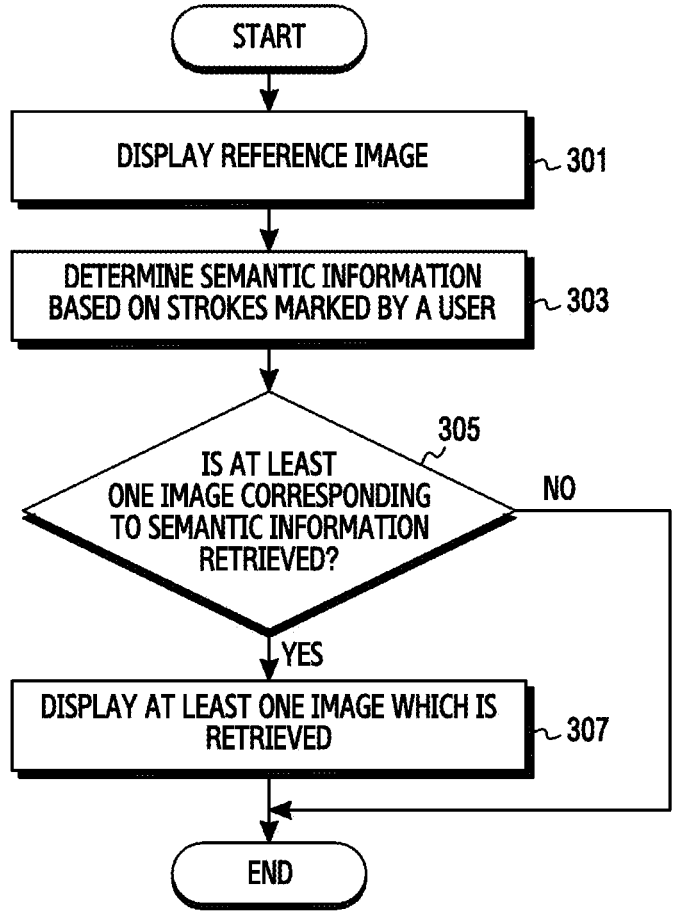
FIG. 3A is a flow diagram of a method for retrieving at least one image from an image database when semantic information is marked by a user as strokes on a reference image, according to an exemplary embodiment.

FIG. 3A is a flow diagram of a method for retrieving at least one image from an image database when semantic information is marked by a user as strokes on a reference image in accordance to the embodiments as described in the present disclosure. FIG. 3A indicates an operating method of an electronic device 100.

Figure 3B:
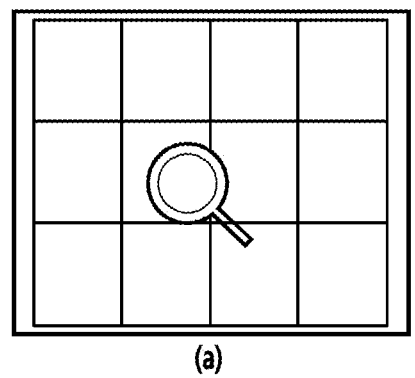
FIG. 3B illustrates a user interface of an electronic device in which at least one image is displayed by retrieving the at least one image from a database when semantic information is marked by a user as strokes on a reference image, according to an exemplary embodiment.
Figure 3B:
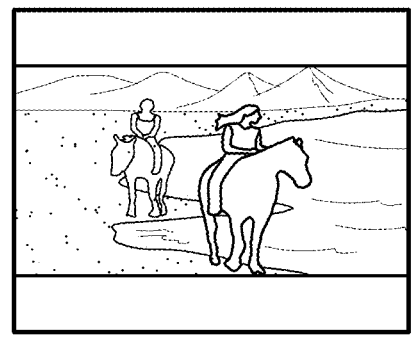
Figure 3B:
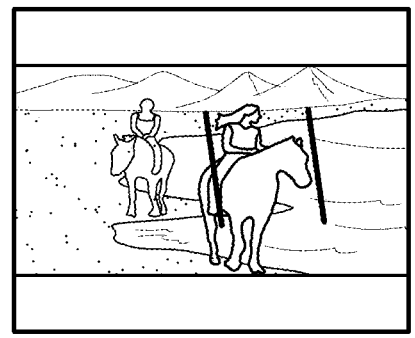
Figure 3B:
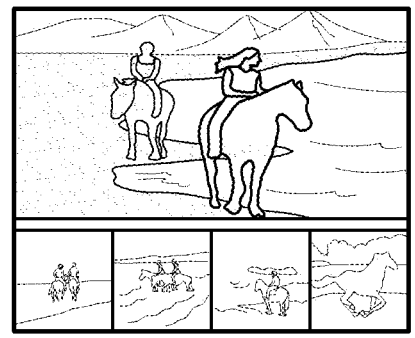

Referring to the FIG. 3A, the electronic device 100 displays a reference image (step 301). The reference image may be selected from an image gallery of the electronic device 100. For example, the image gallery may be displayed on the user interface 106 of the electronic device 100, as shown in (a) of FIG. 3B. The reference image may be displayed on the user interface 106, as shown in (b) of FIG. 3B. The reference image may be named as an input image. The image gallery may display a plurality of images as an application configured to display image database to a user.

The electronic device 100 determines semantic information based on strokes marked by a user on a reference image selected by the user (step 303). Semantic information marked as strokes by a user on a reference image is included in metadata 205. Namely, the electronic device 100 may identify at least one stroke input by a user and may extract semantic information from pixels within extent determined by the at least one stroke. Herein, an input of a user may comprise at least one touch input (e.g a tap, press, drag, etc). For example, at least one stroke inputted by a user is displayed on the user interface 106 as shown in (c) of FIG. 3B. Furthermore, the extent to which semantic information is determined, comprises extent from a starting point of a stroked marked by a user to an end point. The semantic information is associated with an object included in a reference image and a position occupied by the object in the reference image.

The electronic device 100 determines whether an image corresponding to the semantic information is determined (step 305). Namely, the electronic device 100 retrieves at least another image corresponding to semantic information extracted from the reference image from a database. Then, the electronic device 100 determines whether at least one image is retrieved, in other words, whether at least one image corresponding to the semantic information is existed. If at least one image corresponding to the semantic information is not existed, the electronic device 100 may terminate the present procedure. Furthermore, according to another exemplary embodiment, if a displayable image on an image gallery is not existed, the electronic device 100 displays a guide message which guides that retrievable images are not existed via a user interface 106.

On the other hand, if an image, which may be displayed on an image gallery and corresponding to semantic information, is existed, the electronic device 100 displays a retrieved image on the user interface 106 (step 307). For example, if an image corresponding to semantic information is existed, that indicates at least one image including an object on a position of extent occupied by an object among a plurality of images which is stored. Herein, the electronic device 100 may display the reference image with at least one image which is retrieved. For example, as shown in FIG. 2, at least one image which is retrieved may be indicated at a lower end of a screen with a smaller size than the reference image. For example, the electronic device 100 may display the reference image and the at least one image which is retrieved on the user interface 106 of the electronic device 100, as shown in (d) of FIG. 3B.

Figure 4:
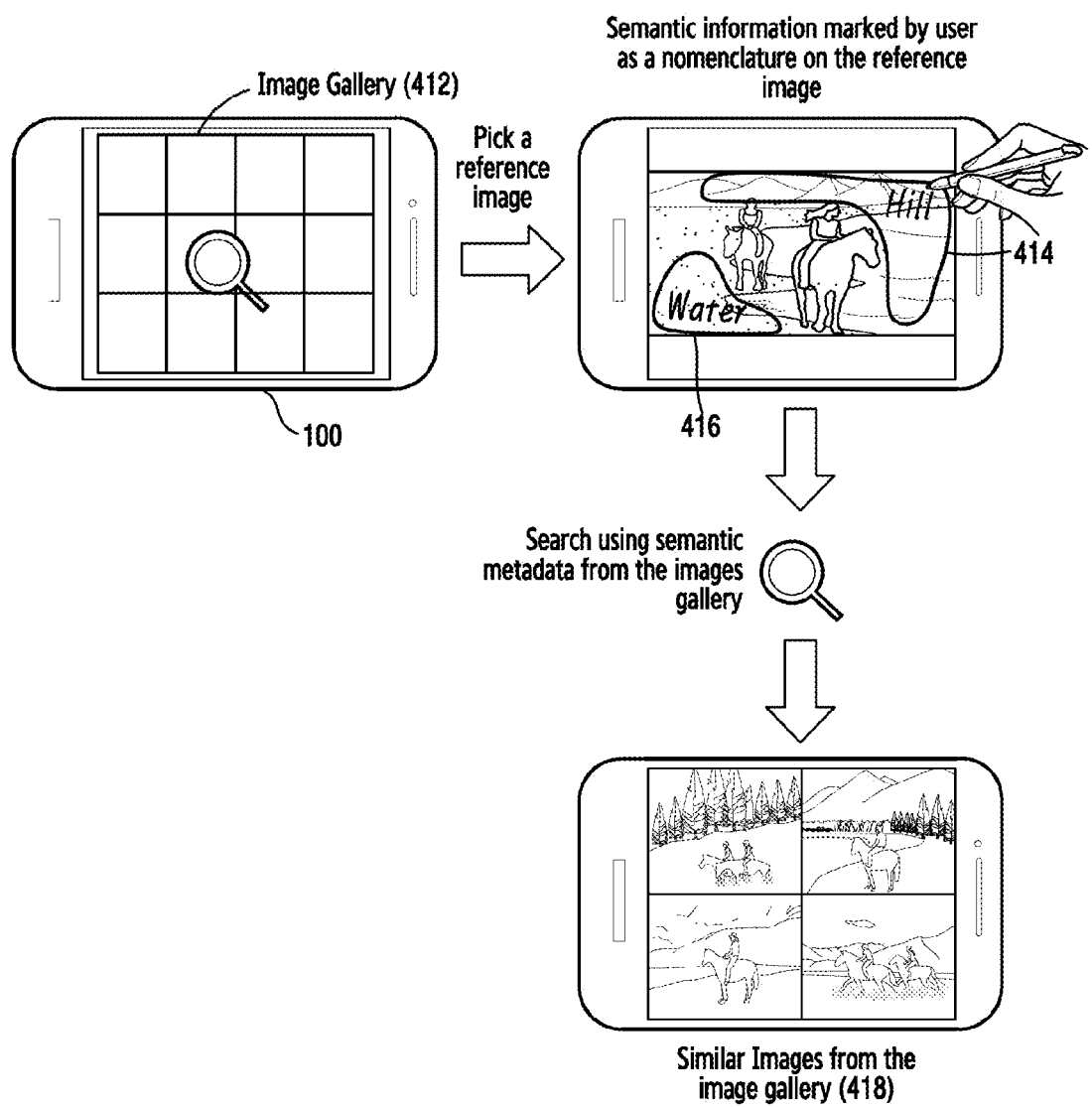
FIG. 4 illustrates an example scenario of retrieving at least one image from the image database when the object data and the position data corresponding to the object data is marked by the user as a nomenclature on the reference image, according to an exemplary embodiment.

FIG. 4 illustrates an example scenario of retrieving at least one image from the image database when the object data and the position data corresponding to the object data is marked by a user as a nomenclature on the reference image, according to an exemplary embodiment. As shown in the FIG. 4, the electronic device 100 may be a mobile device. The image database may be displayed on an image gallery 414 installed in the mobile device or is a plurality of images which is able to be displayed.

Referring to FIG. 4, the user may choose the reference image from the image gallery 412. The controller module 102 can be configured to allow the user to provide the input image data. Further, the controller module 102 can be configured to receive the input image data provided by the user. The input image data may include the object data and the position data corresponding to the object data. The object data and the position data corresponding to the object data may be the semantic information marked by the user using nomenclature on the reference image. For example, the object data may include 'Horse+Woman'. The position data associated with the object data 'Horse+Woman', may include position parameters such as 'Horse+Woman present in right half of an image'. The position parameters may also include position co-ordinates of the object data, if pixels of reference image are represented in a graphical format.

Additionally, the object data may be marked by the user as the strokes on the reference image. The object data may also include 'Hill 414' and 'Water 416' marked by the user on the reference image as names of the object. The position data associated with the object data 'Hill' may be inferred as 'above the 'Horse+Woman' and present in right top-end corner of the reference image'. Additionally, the position data or location of the object data may be identified from the extent of bounding contour of the object.

Further, the semantic information may indicate the semantic metadata of the input image data and is associated with an object included in the reference image and a position occupied by the object in the reference. The image gallery 412 installed in the mobile device displays a plurality of images. Each image of the plurality of images is associated with the object data and the position data corresponding to the object data. Thus, each image in the image gallery 412 is stored along with the semantic metadata or is linked with the semantic metadata to access the semantic metadata corresponding to the image.

Further, the controller module 102 can be configured to search for images 418 matching with the semantic metadata of the input image data. The controller module 102 can be configured to detect if the semantic metadata associated with each image in the image gallery matches the semantic metadata of the input image data. Further, the controller module 102 can be configured to retrieve the images matching the semantic metadata of the input image data. The retrieved images 418 are further displayed on a user interface 106 of the mobile device.

Figure 5A:
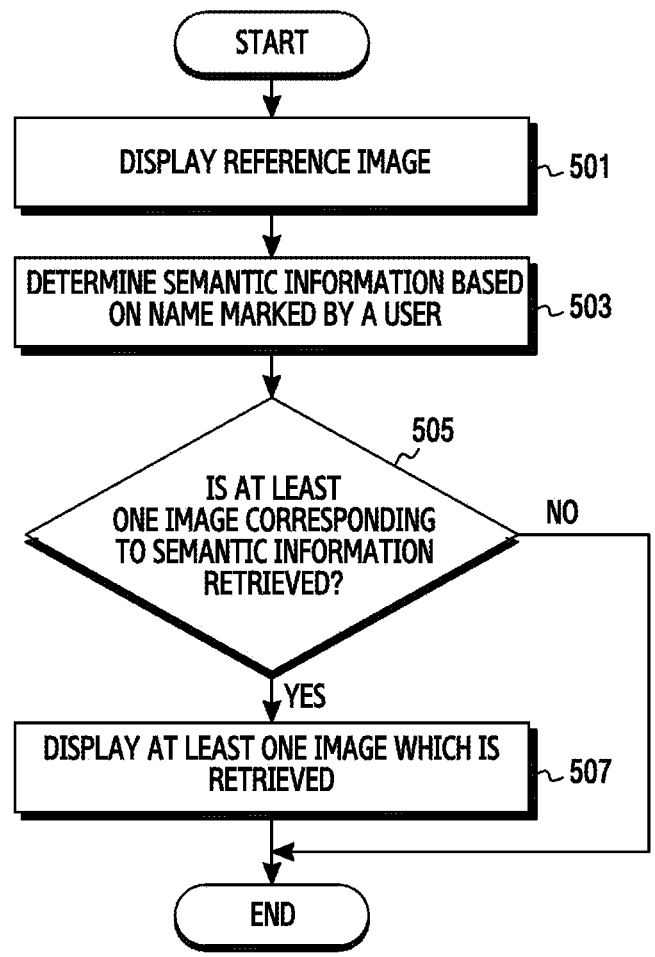
FIG. 5A is a flow diagram of a method for retrieving at least one image from an image database when semantic information is marked by a user as nomenclature on a reference image, according to an exemplary embodiment.

FIG. 5A is a flow diagram of a method for retrieving at least one image from an image database if semantic information is marked by a user as a nomenclature on the reference image, according to an exemplary embodiment. FIG. 5A indicates an operating method of an electronic device 100.

Figure 5B:
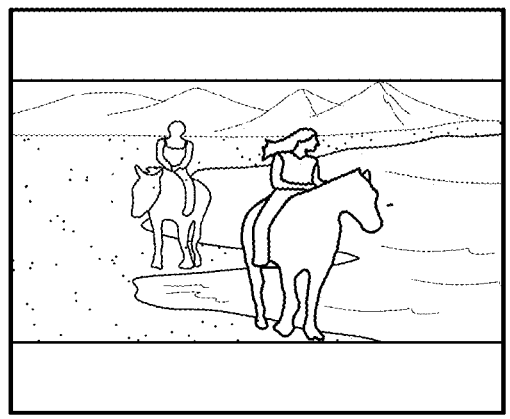
FIG. 5B illustrates a user interface of an electronic device in which at least one image is displayed by retrieving the at least one image from a database, when semantic information is marked by a user as nomenclature on a reference image, according to an exemplary embodiment.
Figure 5B:
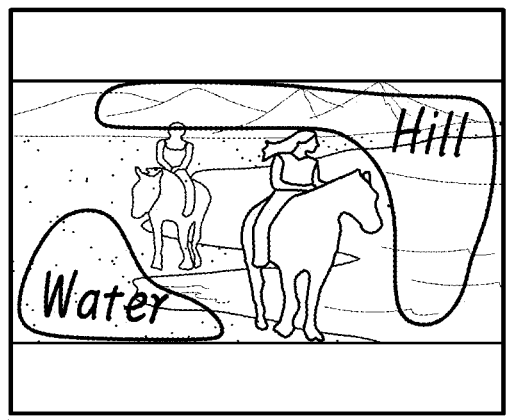
Figure 5B:
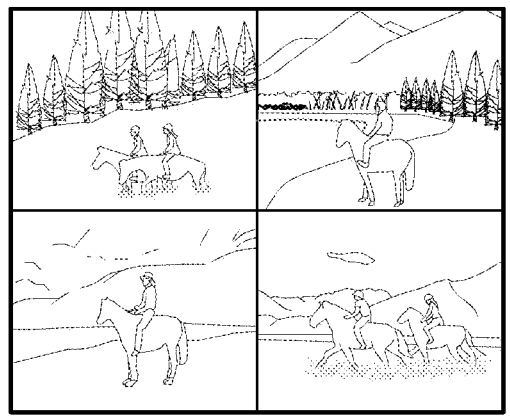

Referring to FIG. 5A, the electronic device 100 displays the reference image by recognizing that a user selects the reference image of the electronic device 100. The reference image may be selected from an image gallery of the electronic device 100. For example, the electronic device 100 may display the reference image on a user interface 106, as shown in (a) of FIG. 5B. The reference image may be named as an input image. The image gallery may display a plurality of images as an application to display the images to the user.

The electronic device 100 determines semantic information based on at least one name designated by the user on the reference image selected by the user. The semantic information is included in semantic metadata 205. Herein, the semantic information may be determined by at least one name and at least one position in which each name is inputted. Herein, the position may be specified by a contour which covers the name designated by the user. For example, at least one name designated by a user in a reference image selected by the user may be displayed as "Hill" by being covered by a counteract at a right upper side of a horse rider such as shown in (b) of FIG. 5B or may be displayed as "Water" by being covered by the counteract at a left lower side of the horse rider. Furthermore, at least one name may be changed to a normal noun such as "Fire", "House", "Rock", etc. and the position of the counteract may be changed along with the mark of the user.

The electronic device 100 determines whether an image corresponding to the semantic information is determined (step 505). Namely, the electronic device 100 retrieves at least another image corresponding to semantic information extracted from the reference image from a database. Then, the electronic device 100 determines whether at least one image is retrieved, in other words, whether at least one image corresponding to the semantic information is existed. If at least one image corresponding to the semantic information is not existed, the electronic device 100 may terminate the present procedure. Further, according to other embodiment, if a displayable image on an image gallery is not existed, the electronic device 100 displays a guide message which guides that retrievable images are not existed via a user interface 106.

On the other hand, if an image, which may be displayed on an image gallery and corresponding to semantic information, is existed, the electronic device 100 displays a retrieved image on the user interface 106 (step 507). Herein, the electronic device 100 may display the reference image with at least one image which is retrieved. For example, as shown in FIG. 4, at least one image which is retrieved may be indicated. For example, the electronic device 100 may display the at least one image which is retrieved on the user interface 106 of the electronic device 100, as shown in (c) of FIG. 5B.

Figure 6:
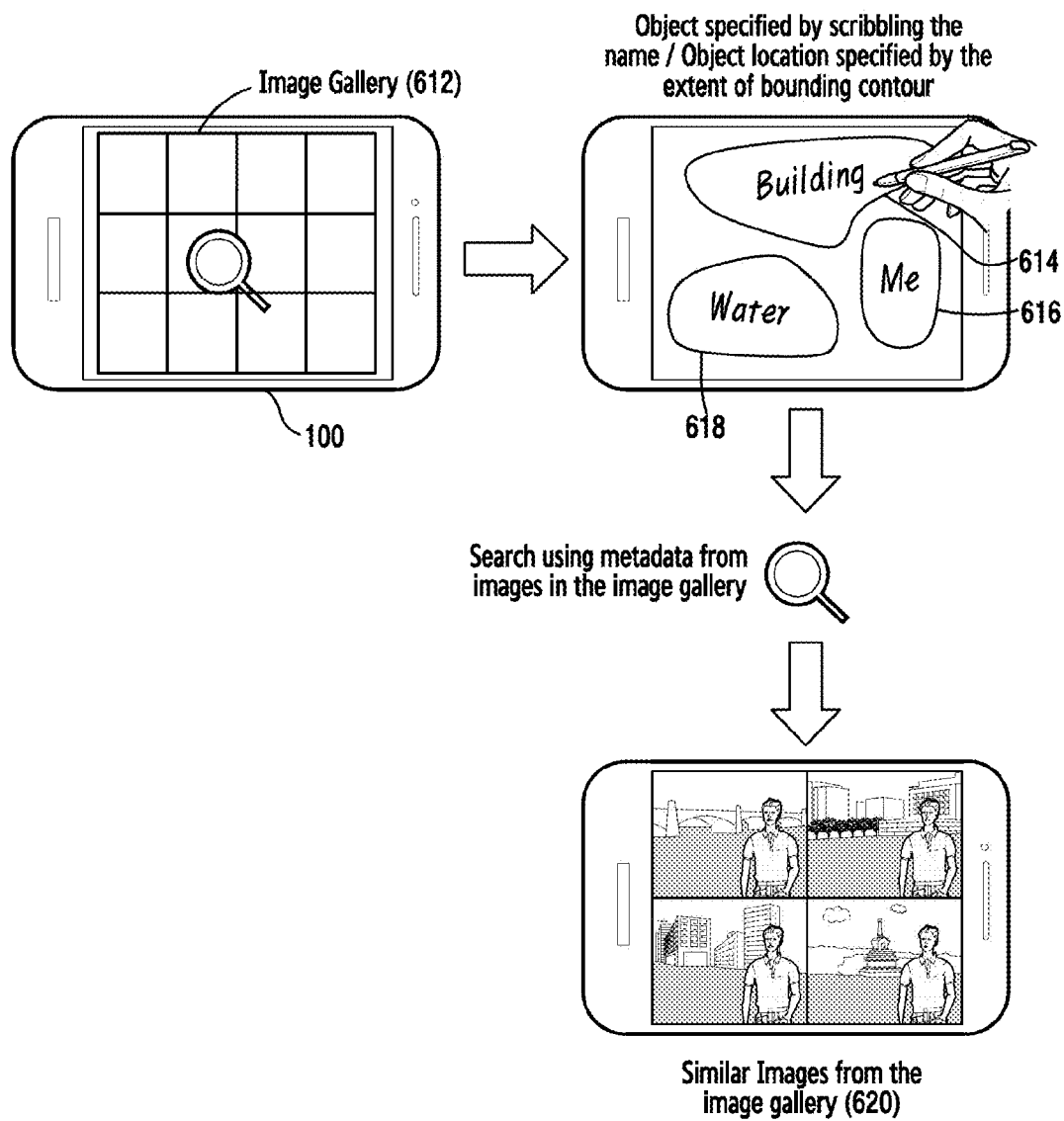
FIG. 6 illustrates an example scenario of retrieving at least one image from an image database when the object data and the position data corresponding to the object data is drawn by the user on a user interface of the electronic device, according to an exemplary embodiment.

FIG. 6 illustrates an example scenario of retrieving at least one image from the image database when the object data and the position data corresponding to the object data are drawn by a user on the user interface 106 of the electronic device 100, according to an exemplary embodiment. As shown in the FIG. 6, the electronic device 100 may be a mobile device. The image database may be displayed through an image gallery installed in the mobile device.

Referring to FIG. 6, the controller module 102 can be configured to allow the user to provide the input image data. Further, the controller module 102 can be configured to receive the input image data provided by the user. The input image data may comprise the object data and the position data corresponding to the object data. The object data and the position data corresponding to the object data may be the semantic information drawn by the user on the user interface 106 of the mobile device. For example, the user interface 106 may be a drawing canvas provided by the mobile device. The user may mark or draw the semantic information on the drawing canvas. As shown in the FIG. 6, the object data may include 'Building', 'Water', and 'Me'. The position data corresponding to the object data may be identified from the extent of the bounding contours 614, 616, and 618 of the objects, according to an exemplary embodiment. For example, the bounding contour of the objects 'Building', 'Water', and 'Me' specifies that the 'Building' is in the top half of the image, 'Water' is in the bottom half of the image, and 'Me' is in the right half of the image.

Further, the semantic information may indicate the semantic metadata of the input image data, and is associated with an object included in the reference image and a position occupied by the object in the image. The image gallery 612 installed in the mobile device displays a plurality of images. Each image of the plurality of images is associated with the object data and the position data corresponding to the object data. Thus, each image in the image gallery is stored along with the semantic metadata or may be stored by including the semantic metadata corresponding to the image.

Further, the controller module 102 can be configured to search for images 612 matching with the semantic metadata of the input image data. The controller module 102 can be configured to detect if the semantic metadata associated with each image in the image gallery matches the semantic metadata of the input image data. Further, the controller module 102 can be configured to retrieve the images matching the semantic metadata of the input image data. The retrieved images 620 are further displayed on the user interface 106 of the mobile device.

Further, the metadata stored along with images displayed on the image gallery 612 is used to be matched with a query image. For example, the query image may be generated by identifying a text inputted by the user on an empty screen or a canvas of the user interface 106 through the controller module 102.

Figure 7A:
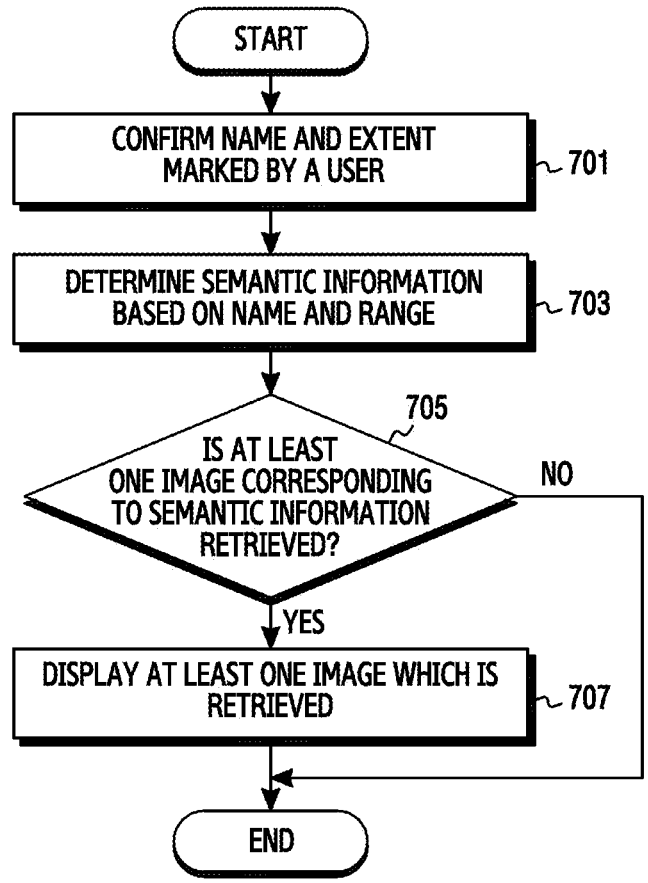
FIG. 7A is a flow diagram of a method for retrieving at least one image from an image database when semantic information is drawn on a user interface of an electronic device by a user, according to an exemplary embodiment.

FIG. 7A is a flow diagram of a method for retrieving at least one image from an image database when semantic information is drawn on a user interface of an electronic device by a user, according to an exemplary embodiment. FIG. 7A indicates an operating method of an electronic device 100.

Referring to FIG. 7A, the electronic device 100 confirms at least one name and at least one extent designated by a user (step 701). The at least one name and the at least one extent are marked on a drawing canvas by a user. For example, the name may be marked by enabling a user to write text on the drawing canvas, and the extent may be marked by enabling a user to draw a contour on the drawing canvas. For example, the contour drawn by the user and the text written by the user are displayed on a user interface 106 of the electronic device 100, as shown in (a) of 7B.

The electronic device 100 determines semantic information based on the at least one name and the at least one extent (step 703). The semantic information is included in metadata. Namely, the electronic device 100 identifies the at least one name and the at least one extent designated by the user, and the semantic information may be extracted from the at least one name and the at least one extent.

The electronic device 100 determines whether an image corresponding to the semantic information (step 705). Namely, the electronic device 100 displays at least another image corresponding to the semantic information extracted from the reference image, and the electronic device 100 determines whether at least one image is retrieved. Thus, the electronic device 100 determines whether at least one image corresponding to the semantic information exists in the image database. If at least one image corresponding to the semantic information does not exist, the electronic device 100 may terminate the present procedure. Furthermore, according to another exemplary embodiment, if a displayable image on an image gallery does not exist, the electronic device 100 displays a guide message which guides that retrievable images do not exist via the user interface 106.

Figure 7B:
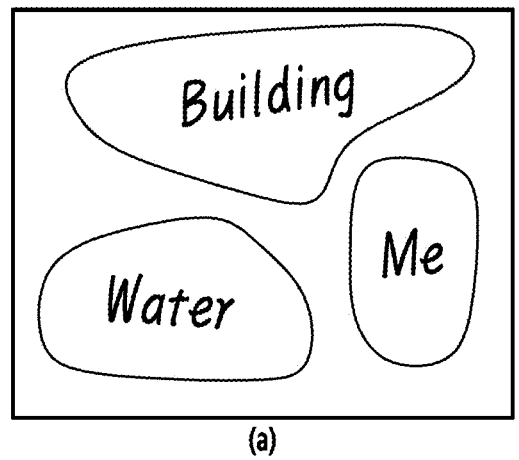
FIG. 7B illustrates a user interface of an electronic device in which in which at least one image is displayed by retrieving at least one image from the image an image database when semantic information is drawn on a user interface of an electronic device by a user, in accordance to the embodiments as described herein.
Figure 7B:
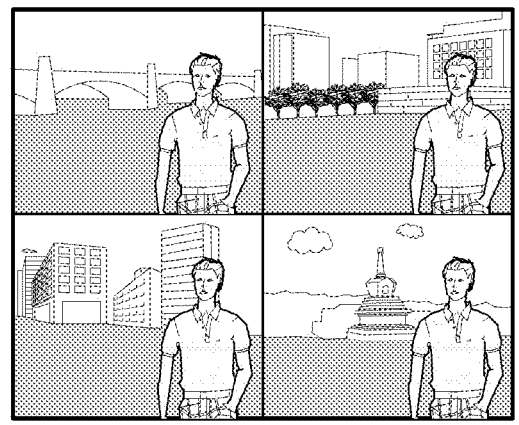

On the other hand, if an image corresponding to semantic information is existed, the electronic device 100 displays a retrieved image on the user interface 106 (step 707). Herein, the electronic device 100 may display the reference image with at least one image which is retrieved. For example, as shown in FIG. 4, at least one image which is retrieved may be indicated. For example, the electronic device 100 may display the at least one image which is retrieved on the user interface 106 of the electronic device 100, as shown in (b) of FIG. 7B.

Figure 8:
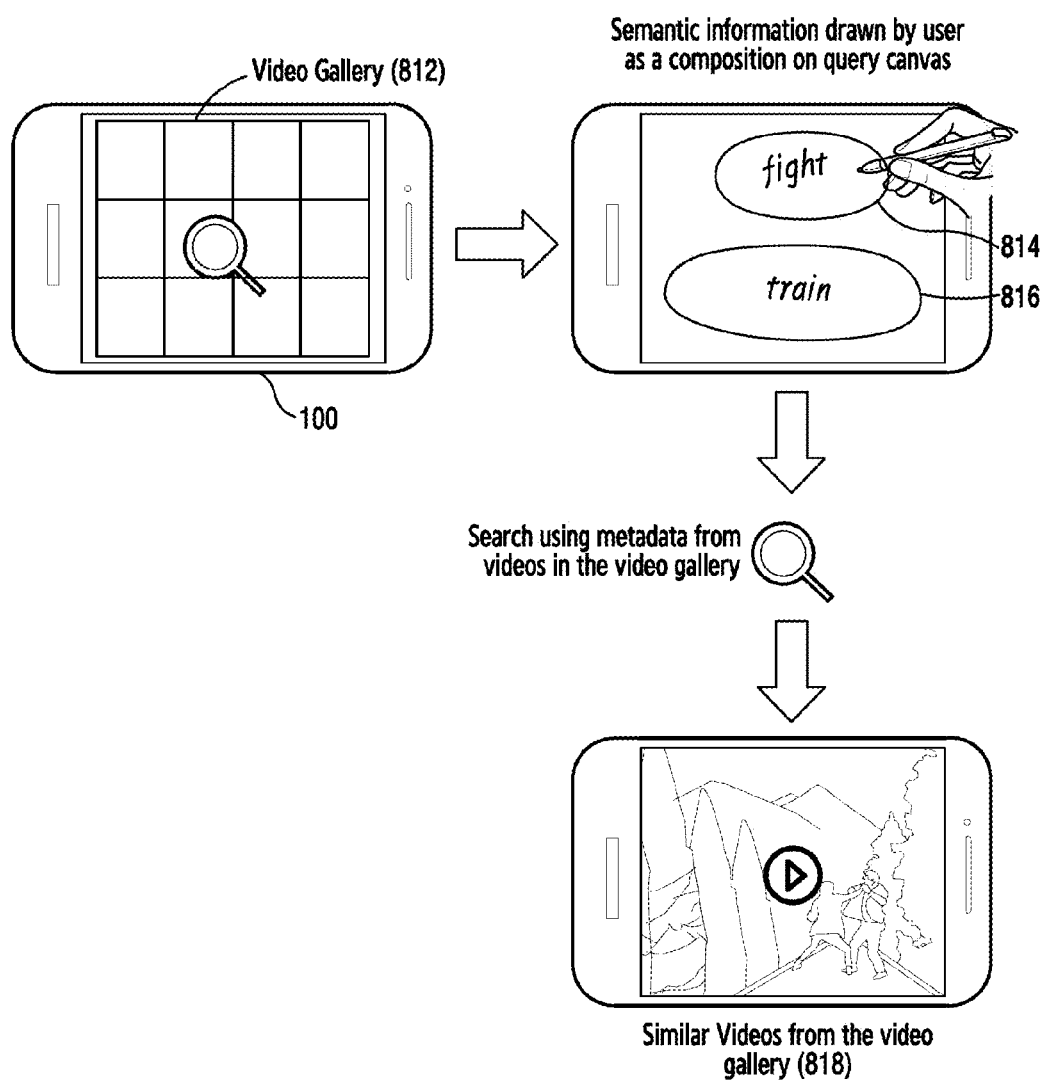
FIG. 8 illustrates an example scenario of retrieving at least one video from a video database, according to an exemplary embodiment.

FIG. 8 illustrates an example of retrieving at least one video from the video database, according to an exemplary embodiment. As shown in the FIG. 8, the electronic device 100 may be a mobile device. The video database may be displayed videos through a video gallery 812 installed in the mobile device.

Referring to FIG. 8, the controller module 102 can be configured to allow the user to provide an input video data. Further, the controller module 102 can be configured to receive the input video data provided by the user. The input video data may comprise the object data and the position data corresponding to the object data. The object data may also include an action data. The object data and the position data corresponding to the object data may be the semantic information drawn by the user on the user interface 106 of the mobile device. For example, the user interface 106 may be a drawing canvas provided by the mobile device. The user may mark or draw the semantic information on the drawing canvas.

As shown in the FIG. 8, the object data may include 'Train'. The action data may include 'Fight'. The position data corresponding to the object data may be identified from the extent of the bounding contour of the object. For example, the bounding contour 814 and 816 of the object 'Train' and the action 'Fight' specifies that a video may include a fight sequence occurring on top of a train.

Further, the semantic information may indicate the semantic metadata of the input video data. The video gallery 812 installed in the mobile device displays a plurality of videos. Each video of the plurality of videos is associated with the object data and the position data corresponding to the object data. Thus, each video in the video gallery is stored along with the semantic metadata.

Further, the controller module 102 can be configured to search for videos 818 matching with the semantic metadata of the input video data. The controller module 102 can be configured to detect if the semantic metadata associated with each video in the video gallery matches the semantic metadata of the input video data. Further, the controller module 102 can be configured to retrieve the videos matching the semantic metadata of the input video data. The retrieved videos 818 are further displayed on the user interface 106 of the mobile device.

Figure 9:
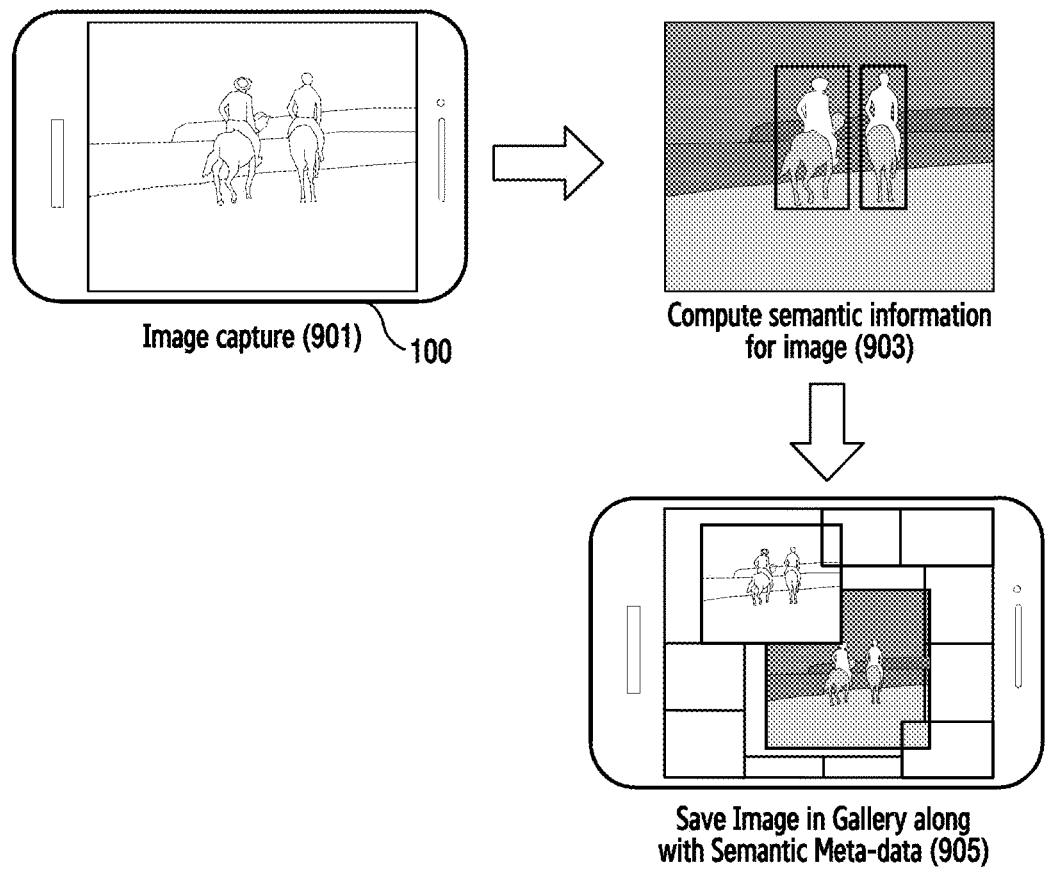
FIG. 9 illustrates an example scenario of associating each image of the image database with object data and position data corresponding to the object data, according to an exemplary embodiment.

FIG. 9 illustrates an example scenario of associating each image of the image database with the object data and the position data corresponding to the object data, according to an exemplary embodiment. As shown in the FIG. 9, the electronic device 100 may be a mobile device.

Referring to FIG. 9, a mobile device may capture an image 901. Further, the controller module 102 can be configured to compute or extract the semantic information of the captured image. The semantic information may include the object data and the position data corresponding to the object data. As illustrated in the FIG. 9, the object data of the captured image may include 'Horse+Man', 'Horse+Man' (a second instance), 'Ground', 'Sky', 'Mountain', and 'Water'. The position data corresponding to the object data may be inferred from location of the objects relative to each other 903. For example, the position data may include 'Horse+Man' and 'Horse+Man' located next to each other in center of the captured image.

Further, the captured image may be saved in the image gallery of the mobile device along with the object data and the position data corresponding to the object data. Thus, the captured image is stored in the image database along with the semantic information as the metadata. Similarly, all the images stored in the image database may be stored along with the semantic information as the metadata. As all the images are stored in the image database using the semantic information as the metadata, the search through the image gallery is faster than the existing search mechanisms. As the search is faster, the images matching a query image may be retrieved faster.

In one embodiment, the object data and the position data corresponding to the object data is extracted from each image based on at least one of a supervised learning technique and an unsupervised learning technique. The extraction of the object data and the position data corresponding to the object data is explained later in conjunction with the FIG. 11.

Figure 10:
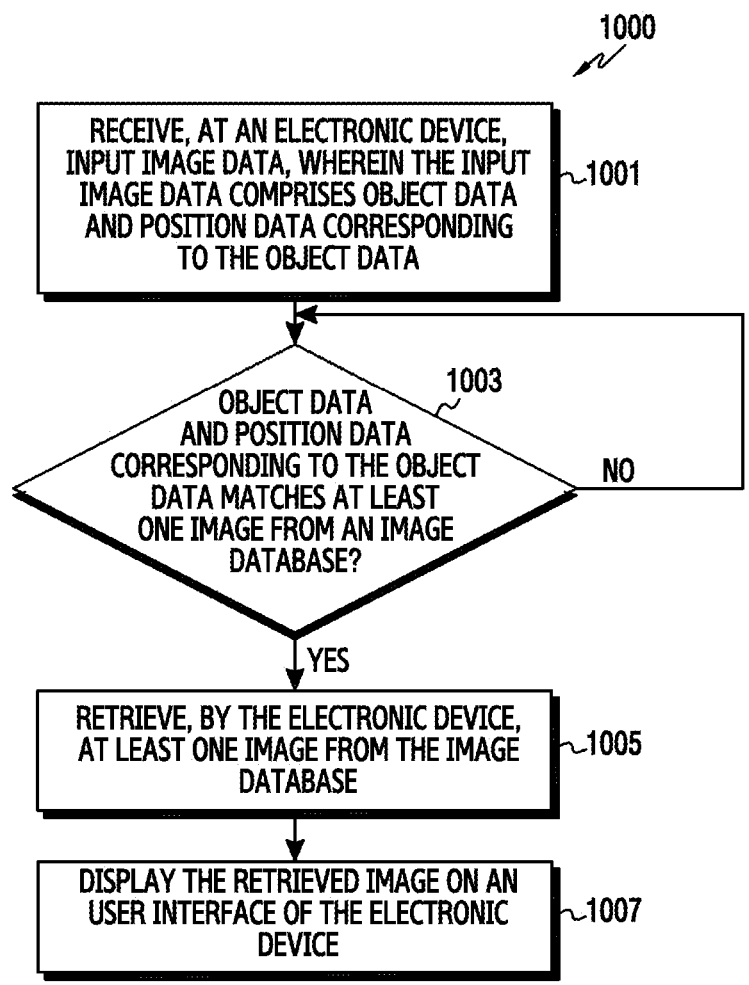
FIG. 10 is a flow diagram illustrating a method for retrieving at least one image from the image database, according to an exemplary embodiment.

FIG. 10 is a flow diagram illustrating a method 1000 for retrieving at least one image from the image database, according to an exemplary embodiment. At step 1001, the method 1000 includes receiving, at the electronic device 100, the input image data. The input image data comprises the object data and the position data corresponding to the object data. In one embodiment, the method 1000 allows the controller module 102 to receive the input image data.

In one embodiment, the object data and the position data corresponding to the object data is marked by the user as strokes on the reference image. In another embodiment, the object data and the position data corresponding to the object data is marked by the user as the nomenclature on the reference image. In another embodiment, the object data and the position data corresponding to the object data is drawn by the user on the user interface 106 of the electronic device 100.

Further, at step 1003, the method 1000 includes checking if the object data and the position data corresponding to the object data match at least one image from the image database. If the object data and position data corresponding to the object data matches at least one image from the image database, at step 1005, the method 1000 includes retrieving that image from the image database. In one embodiment, the method 1000 allows the controller module 102 to retrieve the image from the image database.

Further, at step 1005, the method 1000 includes displaying the retrieved image on the user interface 106 of the electronic device 100. In one embodiment, the method 1000 allows the controller module 102 to display the retrieved image on the user interface 106 of the electronic device 100.

The image database comprises a plurality of images. Each image of the plurality of images is associated with the object data and the position data corresponding to the object data. The object data and the position data corresponding to the object data indicate semantic information of each image. The object data and the position data corresponding to the object data is extracted from each image based on at least one of the supervised learning technique and the unsupervised learning technique.

The various actions, acts, blocks, steps, and the like, in the method 1000, may be performed in the order presented, in a different order or simultaneously. Further, in some embodiments, some actions, acts, blocks, steps, and the like may be omitted, added, modified, skipped, and the like without departing from scope of the disclosure.

Figure 11:
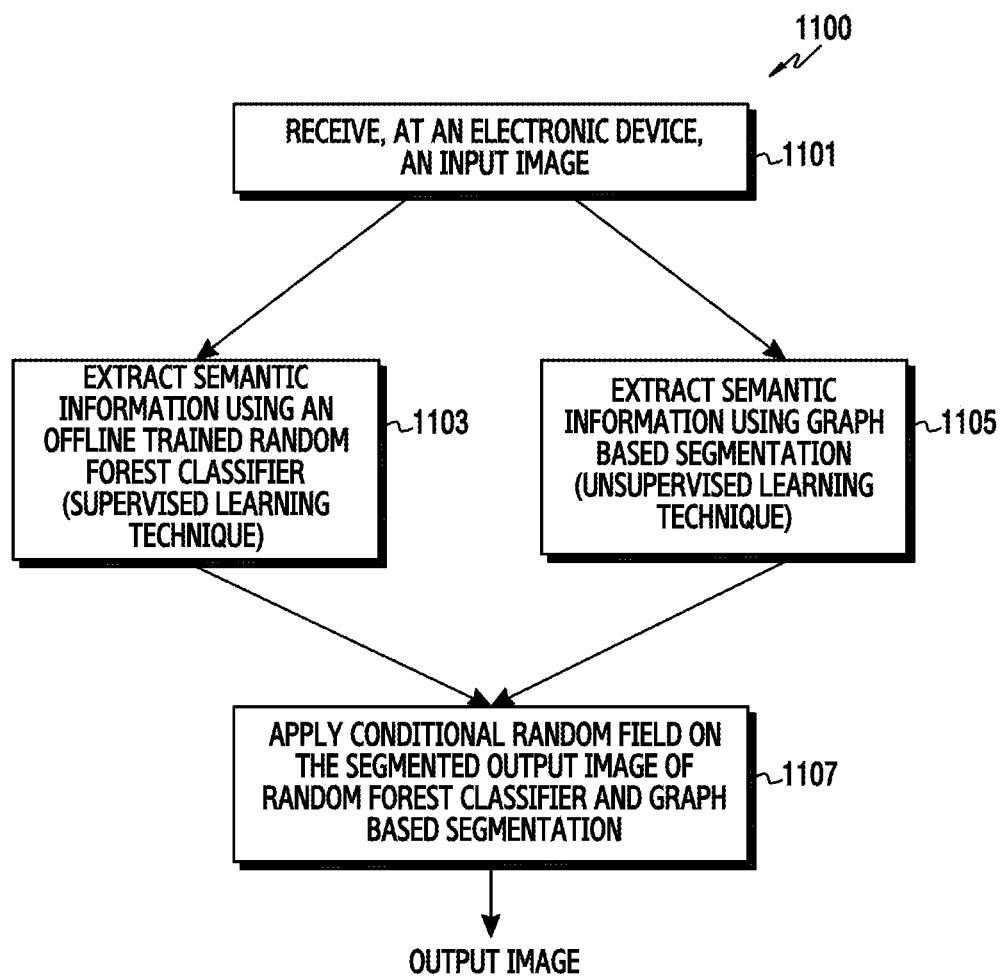
FIG. 11 is a flow diagram illustrating a method for extracting the object data and the position data corresponding to the object data associated with each image, according to an exemplary embodiment.

FIG. 11 is a flow diagram illustrating a method 1100 for extracting the object data and the position data corresponding to the object data associated with each image, according to an exemplary embodiment. The object data and the position data corresponding to the object data associated with each image may indicate the semantic information of the image. Further, the extraction of the semantic information from the image may be referred to as semantic image segmentation.

The semantic image segmentation is intended to segment the image into meaningful classes. Segmenting an outdoor-shot image into 3 classes—Ground, verticals (Building) & Sky may be more meaningful and can be used into various applications such as automatic 3D photo creation, automatic photo popup, region wise automatic image enhancement, or the like.

The semantic image segmentation may be implemented through efficient inference in fully connected Conditional Random Fields (CRFs) with Gaussian Edge Potentials. Initially, a supervised learning algorithm trains a random forest with various images and Ground Truth (GT) of the images. While testing, the images are fed to the random forest to achieve the probability of a pixel belonging to a particular class pixel. Further, the image and pixel wise probabilities of the image are used to evaluate the final class label using a densely connected CRF that establishes pairwise potentials on all pair of the pixels.

The unsupervised learning technique for the semantic image segmentation may be a graph partitioning method or a graph partitioning algorithm. The graph partitioning algorithm defines each pixel as nodes of the graph and an edge is defined as dissimilarity between neighboring pixels. The graph is cut into different connected components such that the edges of the same components have less weight (similarity) and edges between different components have high weights (dissimilarity).

The method 1100 is implemented based on a fact that in a supervised semantic segmentation the accuracy is limited by the prediction accuracy of the random forest. Hence, to improve upon the accuracy of the segmented images fed to a CRF model, a random forest prediction is combined with an unsupervised image segmentation.

Further, it may be assumed that, in an over-segmented image it is least likely that the pixels from a particular patch or super-pixel (segmentation from unsupervised method) may be from a different class. Thus, the controller module 102 can be configured to apply the graph based unsupervised image segmentation on the image segmented by applying the random forest segmentation (supervised image segmentation). During the graph based unsupervised image segmentation, the super-pixel for which all the pixels are assigned the same label in the random forest segmentation is not modified. The super-pixels for which the pixels are distributed over various labels, the potential for each of the pixels are updated depending on the labels of the majority of the pixels. Thus, the proposed method of applying the unsupervised image segmentation on the output of the supervised image segmentation overcomes any error in potential at the edges of the classes arising from the random forest prediction. Thus, the accuracy of the semantic image segmentation is increased.

Referring to the FIG. 11, at step 1101, the method 1100 includes receiving, at the electronic device 100, an input image. At step 1103, the method 1100 includes extracting the semantic information using an offline trained RF classifier (Supervised learning technique). In one exemplary embodiment, the method 1100 allows the controller module 102 to extract the semantic information using the offline trained RF classifier.

At step 1105, the method 1100 includes extracting semantic information using the graph based segmentation (Unsupervised learning technique). In one exemplary embodiment, the method 1100 allows the controller module 102 to extract the semantic information using the graph based segmentation. At step 1107, the method 800 includes applying the CRF on the segmented output image of the RF classifier and the graph based segmentation to provide an accurately segmented output image.

Figure 12A:
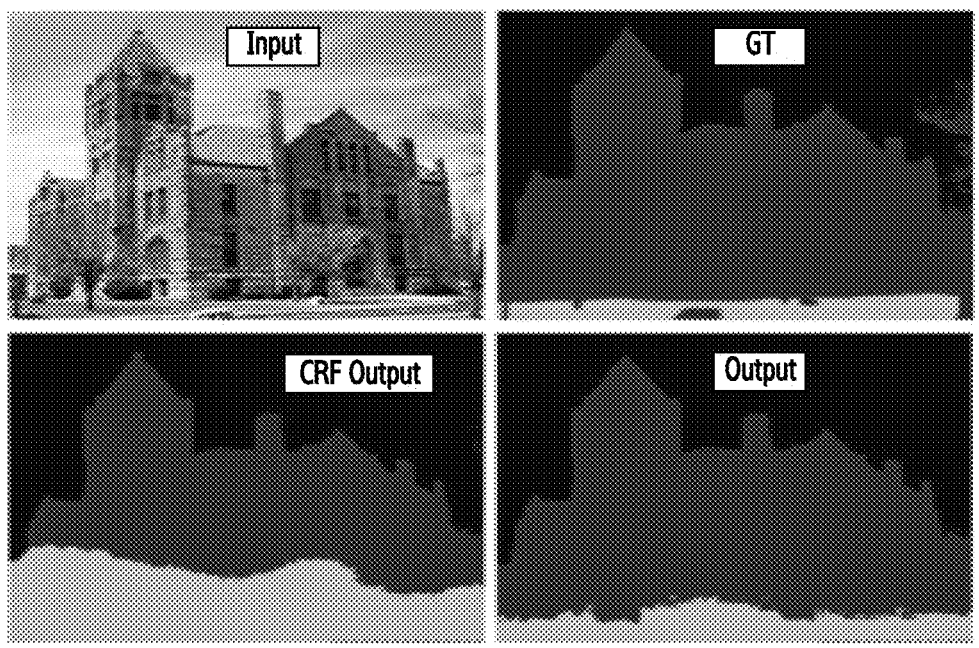
FIG. 12A illustrates an example of a segmented image obtained using a supervised learning technique and an unsupervised learning technique, according to an exemplary embodiment.
Figure 12B:
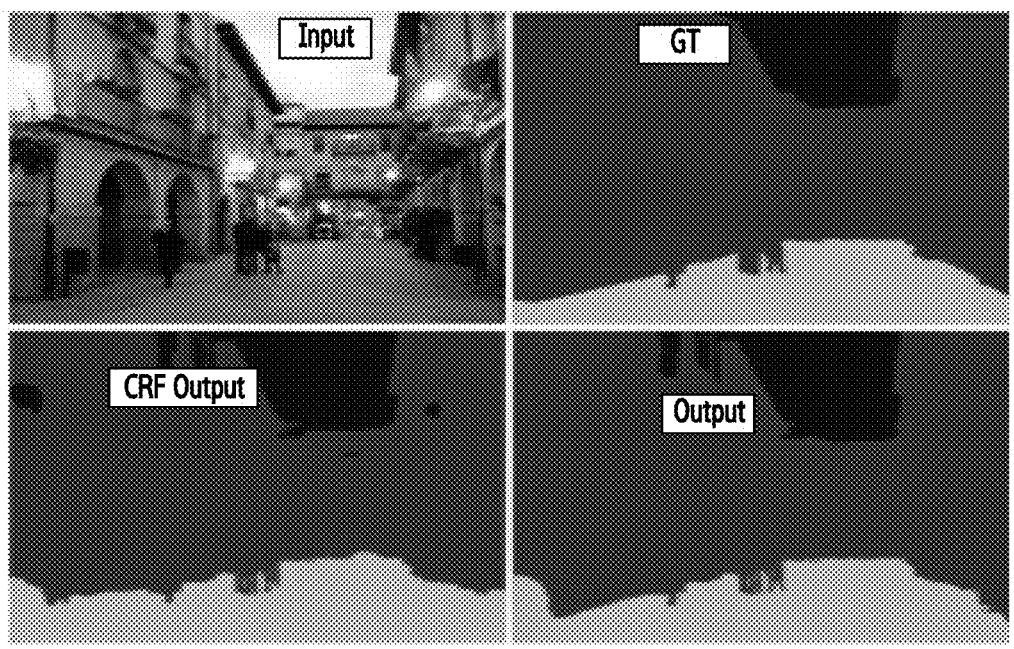
FIG. 12B illustrates another example of an segmented image obtained using the supervised learning technique and the unsupervised learning technique, according to an exemplary embodiment.
Figure 12C:
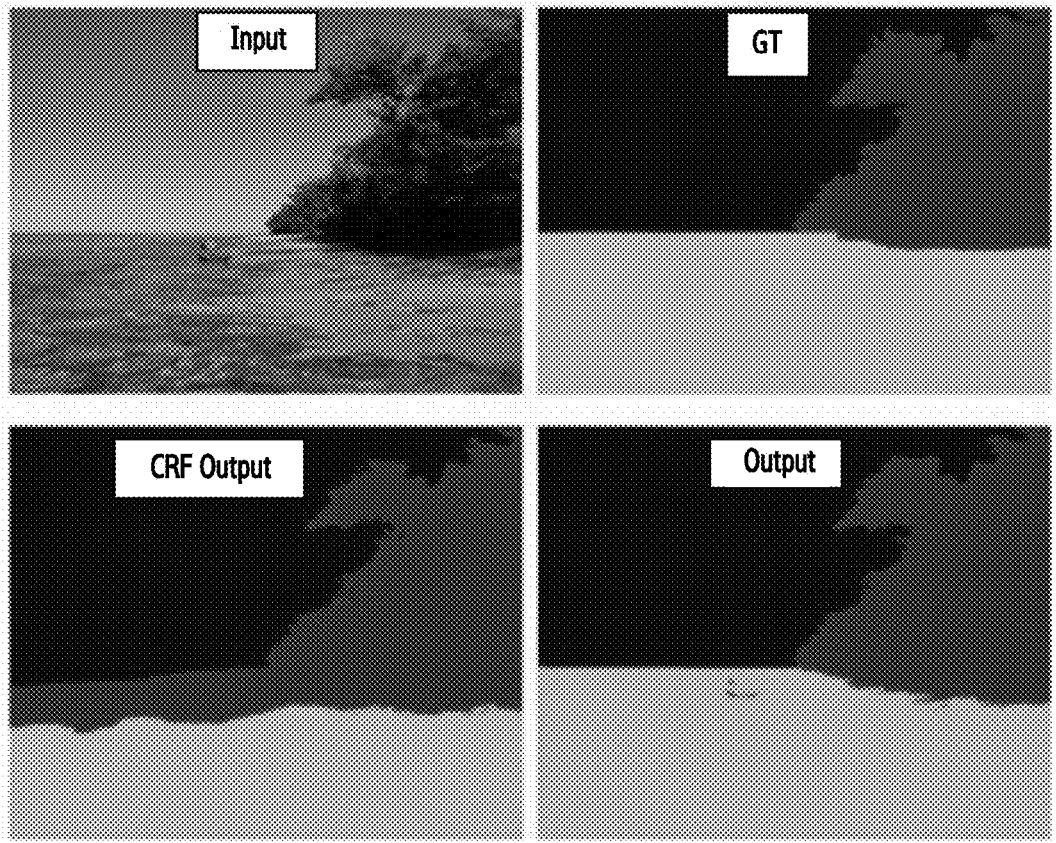
FIG. 12C illustrates another example of an segmented image obtained using the supervised learning technique and the unsupervised learning technique, according to an exemplary embodiment.

The various actions, acts, blocks, steps, and the like in the method 1100 may be performed in the order presented, in a different order or simultaneously. Further, in some embodiments, some actions, acts, blocks, steps, and the like may be omitted, added, modified, skipped, and the like without departing from scope of the disclosure. Results of image segmentation in accordance to the embodiments of the present disclosure are indicated in FIG. 12A illustrates an example of the segmented image obtained using the supervised learning technique and the unsupervised learning technique, according to an exemplary embodiment. FIG. 12B illustrates another example of the segmented image obtained using the supervised learning technique and the unsupervised learning technique, according to an exemplary embodiment. FIG. 12C illustrates another example of the segmented image obtained using the supervised learning technique and the unsupervised learning technique, according to an exemplary embodiment.

In the FIG. 12A, the FIG. 12B, and the FIG. 12C, the top left corner image indicates the input image. The top right corner image indicates the GT. The bottom left corner image indicates the CRF output obtained using existing image segmentation methods. The bottom right corner image indicates the CRF output obtained using the proposed image segmentation method.

As shown in the FIG. 12A, the FIG. 12B, and the FIG. 12C, the CRF output obtained using the proposed image segmentation method is accurate as compared to the CRF output obtained using the existing image segmentation methods. The degree of similarity of the CRF output obtained using the proposed image segmentation method with the GT is more than the degree of similarity of the CRF output obtained using the existing image segmentation methods with the GT.

Figure 13:
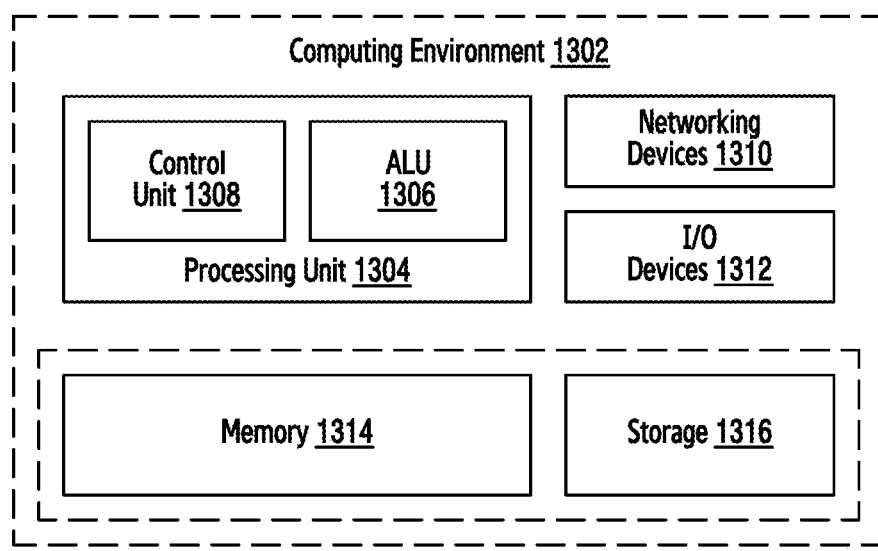
FIG. 13 illustrates a computing environment implementing the method for retrieving at least one image from the image database, according to an exemplary embodiment.

Referring to the FIG. 13, a computing environment 1302 implementing the method for retrieving at least one image from an image database is illustrated. As depicted, the computing environment 1302 includes at least one processing unit 1304 that is equipped with a control unit 1308 and an Arithmetic Logic Unit (ALU) 1306, a memory 1314, a storage 1316, plurality of networking devices 1310 and a plurality Input output (I/O) devices 1312. The processing unit 1304 is responsible for processing the instructions of the algorithm. The processing unit 1304 receives commands from the control unit 1308 in order to perform its processing. Further, any logical and arithmetic operations involved in the execution of the instructions are computed with the help of the ALU 1306.

The overall computing environment 1302 can be composed of multiple homogeneous or heterogeneous cores, multiple CPUs of different kinds, special media and other accelerators. The processing unit 1304 is responsible for processing the instructions of the algorithm. Further, the plurality of processing units 1304 can be located on a single chip or over multiple chips.

The algorithm comprising of instructions and codes required for the implementation are stored in either the memory 1314 or the storage 1316 or both. At the time of execution, the instructions can be fetched from the corresponding memory 1314 or storage 1316, and executed by the processing unit 1304.

In case of any hardware implementations various networking devices 1010 or external I/O devices 1312 can be connected to the computing environment to support the implementation through the networking unit and the I/O device unit.

The embodiments disclosed herein can be implemented through at least one software program running on at least one hardware device and performing network management functions to control the elements. The FIGS. 1 through 13 includes blocks which can be at least one of a hardware device or a combination of hardware device and software module. Further, the present disclosure relates to a method and a device to enable a user to effectively retrieve images, in which the intention of the user is reflected, by retrieving the images based on semantic information.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and extent of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating an electronic device, the method comprising:
    detecting a user input on an image displayed in the electronic device;
    determining, by the electronic device, an object included in the image, based on the detected user input;
    retrieving at least one image from among a plurality of images stored in the electronic device, by comparing the object to metadata associated with each of the plurality of images; and
    displaying, by the electronic device, the at least one image,
    wherein the metadata comprises information regarding at least one object included in each of the plurality of images, and the information regarding the at least one object is determined by applying an unsupervised image segmentation to an output of a supervised image segmentation on each of the plurality of images, and
    wherein the supervised image segmentation comprises training a random forest with a ground truth associated with the each of the plurality of images for processing pixels in the plurality of images, and the unsupervised image segmentation comprises a graph partitioning algorithm that defines each pixel for further processing the pixels.

2. The method of claim 1, wherein the determining the object comprises determining the object in the image based on at least one stroke or contour marked as the user input on the image.

3. The method of claim 1, wherein the determining the object comprises determining the object in the image based on a name corresponding to a text input as the user input.

4. The method of claim 1, further comprising:
    determining, by the electronic device, the metadata including the information regarding the at least one object included in each of the plurality of images based on the image segmentations applied on each of the plurality of images; and
    storing each of the plurality of images with the metadata.

5. The method of claim 1, wherein the information regarding the at least one object indicate semantic information of each of the plurality of images, and
    wherein the metadata comprises semantic metadata of each of the plurality of images.

6. An electronic device comprising:
    a controller configured to:
        detect a user input on an image displayed in the electronic device;

determine an object included in the image, based on the detected user input; and retrieve at least one image from among a plurality of images stored in the electronic device, by comparing the object to metadata associated with each of the plurality of images; and a user interface configured to display the at least one image, wherein the metadata comprises information regarding at least one object included in each of the plurality of images, and the information regarding the at least one object is determined by applying an unsupervised image segmentation to an output of a supervised image segmentation on each of the plurality of images, and wherein the supervised image segmentation comprises training a random forest with a ground truth associated with the each of the plurality of images for processing pixels in the plurality of images, and the unsupervised image segmentation comprises a graph partitioning algorithm that defines each pixel for further processing the pixels.

7. The device of claim 6, wherein the controller is further configured to determine the object in the image based on at least one stroke or contour marked as the user input on the image.

8. The device of claim 6, wherein the controller is further configured to determine the object in the image based on a name corresponding to a text input as the user input.

9. The device of claim 6, further comprising:

a memory configured to store data, wherein the controller is further configured to determine the metadata including the information regarding the at least one object included in each of the plurality of images, based on the image segmentations applied on each of the plurality of images, and wherein the memory is configured to store each of the plurality of images with the metadata.

10. The device of claim 6, wherein the information regarding the at least one object indicate semantic information of each of the plurality of images, and wherein the metadata comprises semantic metadata of each of the plurality of images.

11. The method of claim 1, wherein the user input comprises at least one of a tap input, a press input or a drag input.

12. The device of claim 6, wherein the user input comprises at least one of a tap input, a press input or a drag input.

13. The method of claim 1, wherein each of the output of the supervised image segmentation on each of the plurality of images, is processed depending on labels of the pixels thereof during applying the unsupervised image segmentation thereon.

14. The method of claim 13, wherein the output of the supervised image segmentation, for which the pixels are assigned to the same label, is not modified during applying the unsupervised image segmentation thereon.

15. The method of claim 13, wherein the output of the supervised image segmentation, for which the pixels are distributed over various labels, is updated depending on the labels of the majority of the pixels during applying the unsupervised image segmentation thereon.

16. The device of claim 6, wherein each of the output of the supervised image segmentation on each of the plurality of images, is processed depending on labels of the pixels thereof during applying the unsupervised image segmentation thereon.

17. The device of claim 16, wherein the output of the supervised image segmentation, for which the pixels are assigned to the same label, is not modified during applying the unsupervised image segmentation thereon.

18. The device of claim 16, wherein the output of the supervised image segmentation, for which the pixels are distributed over various labels, is updated depending on the labels of the majority of the pixels during applying the unsupervised image segmentation thereon.

* * * * *